(12) United States Patent
Yamamoto et al.

(10) Patent No.: US 11,890,892 B2
(45) Date of Patent: Feb. 6, 2024

(54) LAYER TRANSFER DEVICE

(71) Applicant: BROTHER KOGYO KABUSHIKI KAISHA, Nagoya (JP)

(72) Inventors: Tomoya Yamamoto, Aichi (JP); Kouichi Sugimoto, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/388,408

(22) Filed: Jul. 29, 2021

(65) Prior Publication Data
US 2022/0016878 A1 Jan. 20, 2022

Related U.S. Application Data

(63) Continuation of application No. PCT/JP2019/020645, filed on May 24, 2019.

(30) Foreign Application Priority Data

Jan. 29, 2019 (JP) .................. 2019-012736
Jan. 30, 2019 (JP) .................. 2019-014415
(Continued)

(51) Int. Cl.
*B44C 1/17* (2006.01)
*B41F 16/00* (2006.01)
(Continued)

(52) U.S. Cl.
CPC ............ *B44C 1/17* (2013.01); *B32B 37/0053* (2013.01); *B32B 38/004* (2013.01); *B41F 16/00* (2013.01);
(Continued)

(58) Field of Classification Search
CPC ..... B44C 1/17; B32B 37/0053; B32B 38/004; B32B 2037/0061; B41F 16/00;
(Continued)

(56) References Cited

U.S. PATENT DOCUMENTS 5,179,415 A * 1/1993 Ikematsu ........... G03G 15/2035
                                                    399/331
5,956,067 A    9/1999 Isono et al.
(Continued)

FOREIGN PATENT DOCUMENTS

CN    103228452 B    1/2016
JP    H01163789 A    6/1989
(Continued)

OTHER PUBLICATIONS

International Search Report for International Application No. PCT/JP2019/020645 dated Aug. 20, 2019 (13 pages).
(Continued)

*Primary Examiner* — Francisco W Tschen
*Assistant Examiner* — Abhishek A Patwardhan
(74) *Attorney, Agent, or Firm* — Merchant & Gould P.C.

(57) ABSTRACT

A layer transfer device includes a housing main body having an opening, a cover movable between an open position in which the opening is open and a closed position in which the opening is closed, a heating member provided in the housing main body and configured to heat a multilayer film and a sheet, a pressure member provided on the cover and configured to nip the multilayer film and a sheet laid on the multilayer film between the heating member and the pressure member, and a shutter movable between a protecting position in which the heating member is covered with the shutter, and a retreated position in which the shutter is away from the protecting position. The shutter is in the protecting position when the cover is in the open position.

18 Claims, 10 Drawing Sheets

(30) Foreign Application Priority Data

| | | | |
|---|---|---|---|
| Jan. 30, 2019 | (JP) | ................................ | 2019-014419 |
| Jan. 31, 2019 | (JP) | ................................ | 2019-015452 |

(51) Int. Cl.
  *G03G 15/20* (2006.01)
  *B32B 37/00* (2006.01)
  *B32B 38/00* (2006.01)

(52) U.S. Cl.
  CPC ..... *G03G 15/2032* (2013.01); *G03G 15/2064* (2013.01); *B32B 2037/0061* (2013.01)

(58) Field of Classification Search
  CPC ............... B41F 16/006; B41F 16/0026; G03G 15/2032; G03G 15/2064; G03G 15/6582; B65C 9/10
  See application file for complete search history.

(56) References Cited

U.S. PATENT DOCUMENTS

| | | | | |
|---|---|---|---|---|
| 6,431,244 | B1* | 8/2002 | Moriguchi | B32B 37/226 156/582 |
| 7,979,000 | B2* | 7/2011 | Sekina | G03G 21/168 399/121 |
| 8,810,619 | B2 | 8/2014 | Kaneoya et al. | |
| 2002/0021926 | A1 | 2/2002 | Yamamoto et al. | |
| 2006/0239715 | A1* | 10/2006 | Lee | G03G 15/2035 399/122 |
| 2013/0250026 | A1 | 9/2013 | Kaneoya et al. | |
| 2019/0094767 | A1* | 3/2019 | Sakai | G03G 15/2042 |

FOREIGN PATENT DOCUMENTS

| | | | |
|---|---|---|---|
| JP | H0468382 | A | 3/1992 |
| JP | H05202656 | A | 8/1993 |
| JP | H05265339 | A | 10/1993 |
| JP | H06188589 | A | 7/1994 |
| JP | 7-125270 | A | 5/1995 |
| JP | H07140820 | A | 6/1995 |
| JP | H07290685 | A | 11/1995 |
| JP | H1115326 | A | 1/1999 |
| JP | 2002120960 | A | 4/2002 |
| JP | 2005-35050 | | 2/2005 |
| JP | 2007216395 | A | 8/2007 |
| JP | 4447870 | | 4/2010 |
| JP | 2017-113909 | A | 6/2017 |
| JP | 2018093599 | A | 6/2018 |

OTHER PUBLICATIONS

International Preliminary Report on Patentability and Written Opinion of the International Searching Authority issued in corresponding International Patent Application No. PCT/JP2019/020645, dated Jul. 27, 2021.

First Office Action issued in corresponding Japanese Patent Application No. 2019-015452, dated Dec. 27, 2022.

* cited by examiner

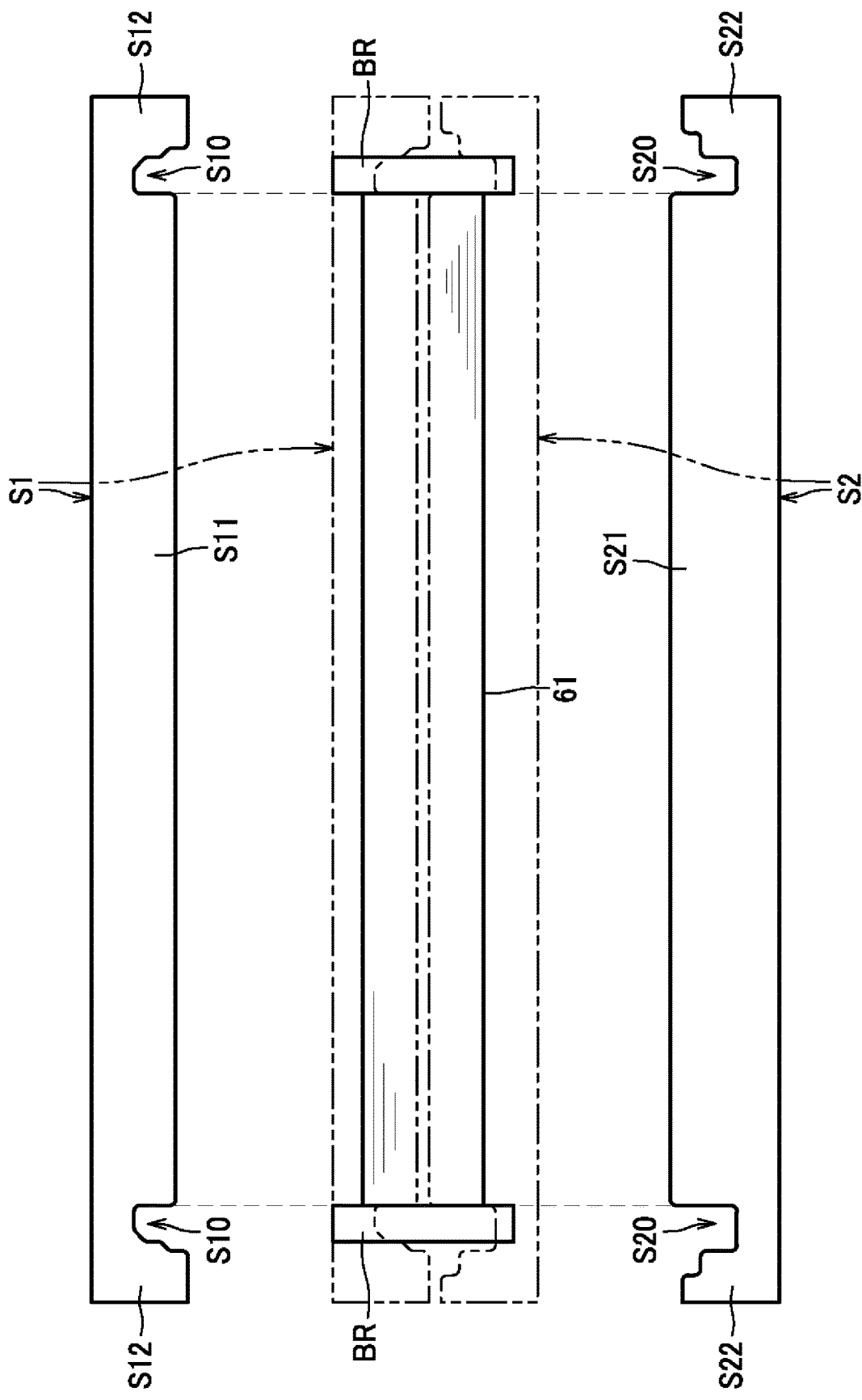

LAYER TRANSFER DEVICE

CROSS-REFERENCE TO RELATED APPLICATION(S)

This application is a continuation of International Application No. PCT/JP2019/020645 filed on May 24, 2019, which claims priority from Japanese Patent Applications No. 2019-012736 filed on Jan. 29, 2019, No. 2019-014415 filed Jan. 30, 2019, No. 2019-014419 filed on Jan. 30, 2019, and No. 2019-015452 filed on Jan. 31, 2019, the disclosures of which are incorporated herein by reference in their entirety.

TECHNICAL FIELD

This disclosure relates to a layer transfer device for transferring a transfer layer onto an image formed on a sheet.

BACKGROUND ART

A layer transfer device including a supply reel on which a multilayer film is wound, a take-up reel on which to take up the multilayer film, a heating roller configured to heat the multilayer film and a sheet, and a pressure roller configured to nip the multilayer film and the sheet in combination with the heating roller is known in the art.

The supply reel and the take-up reel may be configured as a film unit installable into and removable from a housing of the layer transfer device.

SUMMARY

In the configuration described above, the layer transfer device may have a cover to open and close an opening provided in a main body of the housing for replacement of the film unit. When the cover is opened to change the film unit, the heating roller may be exposed to outside, which entails a risk that a user would touch the heating roller.

It would be desirable to provide a layer transfer device of which a heating member (e.g., heating roller) is restrained from being touched by a user during replacement of the film unit.

In one aspect, a layer transfer device for transferring a transfer layer of a multilayer film onto an image formed on a sheet is disclosed. The layer transfer device comprises a film unit, a housing main body, a cover, a heating member, a pressure member, and a shutter. The film unit comprises a supply reel on which the multilayer film is wound, and a take-up reel on which to take up the multilayer film. The housing main body has an opening that allows the film unit to be installed into and removed from the housing main body therethrough along a direction perpendicular to a rotation axis of the supply reel. The cover is movable between an open position in which the opening is open and a closed position in which the opening is closed. The heating member is provided in the housing main body and configured to heat the multilayer film and the sheet. The pressure member is provided on the cover and configured to nip the multilayer film and the sheet laid on the multilayer film between the heating member and the pressure member. The shutter is movable between a protecting position in which the heating member is covered with the shutter, and a retreated position in which the shutter is away from the protecting position. When the cover is in the open position, the shutter is in the protecting position.

BRIEF DESCRIPTION OF THE DRAWINGS

The above and other aspects, their advantages and further features will become more apparent by describing in detail illustrative, non-limiting embodiments thereof with reference to the accompanying drawings, in which:

FIG. 8 is a diagram for explaining a relationship between each of the shutters and a bearing;

DESCRIPTION OF EMBODIMENTS

A description will be given of one embodiment with reference made to the drawings where appropriate. In the following description, a general setup of a layer transfer device will be briefly described at the outset, and specific configurations and features will be described thereafter.

Figure 1A:
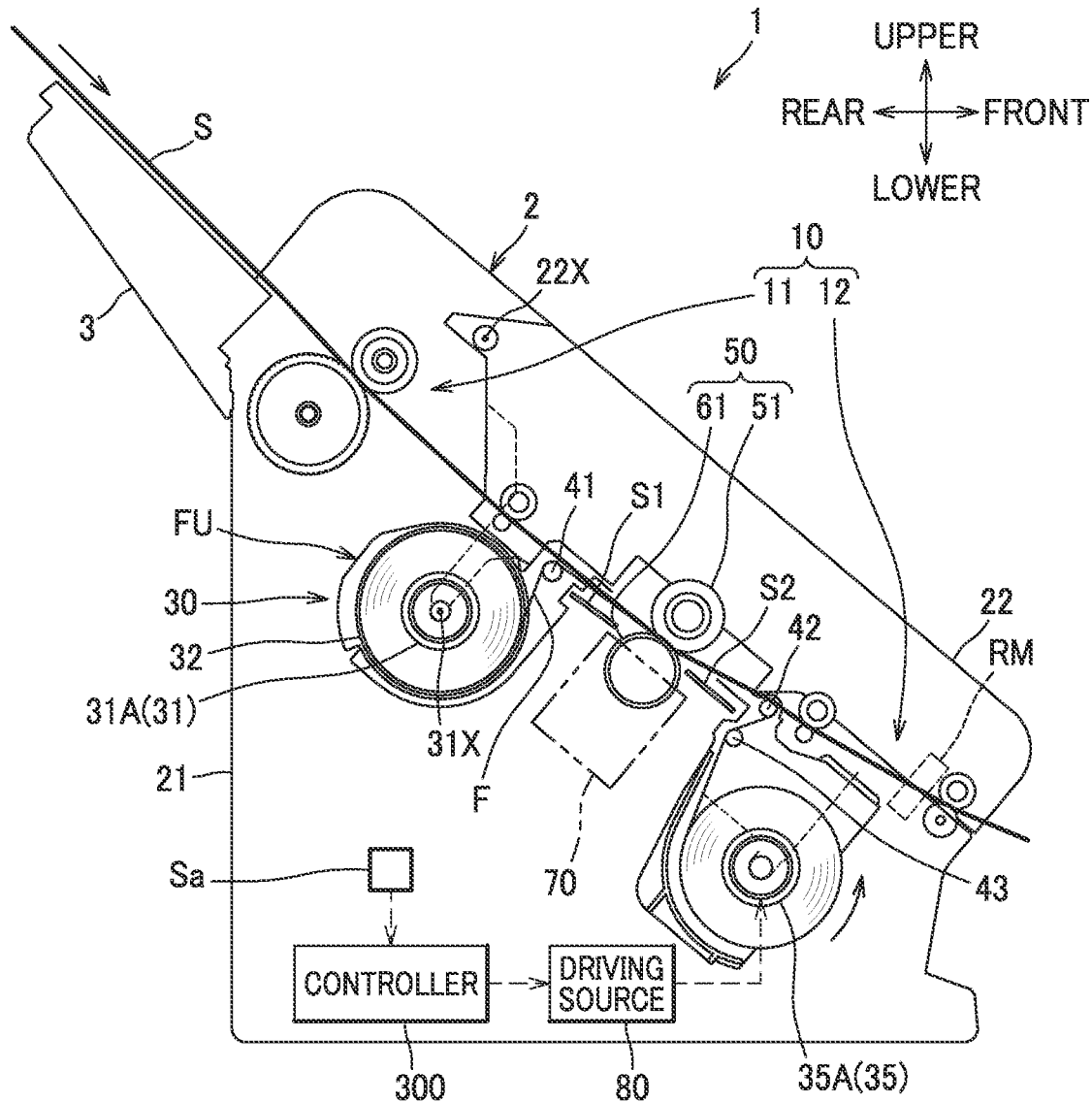
FIG. 1A is a diagram showing a layer transfer device according to one embodiment.

In the following description, directions will be referred to as directions shown in FIG. 1A. That is, the right-hand side of FIG. 1A is referred to as "front", the left-hand side of FIG. 1A as "rear", the front side of the drawing sheet of FIG. 1A as "left", and the back side of the drawing sheet of FIG. 1A as "right". Similarly, upward/downward directions (upper/lower sides) of FIG. 1A are referred to as "upward/downward (upper/lower)".

As shown in FIG. 1A, a layer transfer device 1 is a device for post-processing to be subjected to a sheet S on which an image is formed (e.g., printed in ink) by an image forming apparatus, for example, a toner image is formed by a laser printer; more specifically, a device for transferring foil such as of aluminum or the like onto the toner image on the sheet S. The layer transfer device 1 thus forms a foil image on the sheet S by transferring foil onto the toner image on the sheet S. The layer transfer device 1 includes a housing 2, a sheet tray 3, a sheet conveyor unit 10, a film supply unit 30, and a transfer unit 50.

The housing 2 is made of plastic or the like, and includes a housing main body 21 and a cover 22. The housing main body 21 has an opening 21A at its upper side (see FIG. 2). The opening 21A is an opening through which to cause a film unit FU as will be described later to be installed into or removed from the housing main body 21. The cover 22 is a member for opening and closing the opening 21A. A rear end portion of the cover 22 is rotatably supported by the housing main body 21. The cover 22 is configured to be rotatable on a rotation axis 22X between a closed position in which the opening 21A is closed (position in FIG. 1A) and an open position in which the opening 21A is open (position in FIG. 2).

The sheet tray 3 is a tray on which sheets S such as of paper, OHP film, etc., are placed. The sheet tray 3 is provided at a rear portion of the housing 2. The sheets S, with surfaces thereof having toner images formed thereon facing downward, are placed on the sheet tray 3.

The sheet conveyor unit 10 includes a sheet feed mechanism 11 and a sheet ejection mechanism 12. The sheet feed mechanism 11 is a mechanism that conveys sheets S on the sheet tray 3 one by one toward the transfer unit 50. The sheet feed mechanism 11 includes a pickup roller, a retard roller, and a conveyor roller.

The sheet ejection mechanism 12 is a mechanism that ejects a sheet S which has passed through the transfer unit 50, to the outside of the housing 2. The sheet ejection mechanism 12 includes a plurality of conveyor rollers.

The film supply unit 30 is a unit that supplies and lays a multilayer film F onto a sheet S conveyed from the sheet feed mechanism 11. The film supply unit 30 includes a film unit FU, and a driving source 80.

Figure 2:
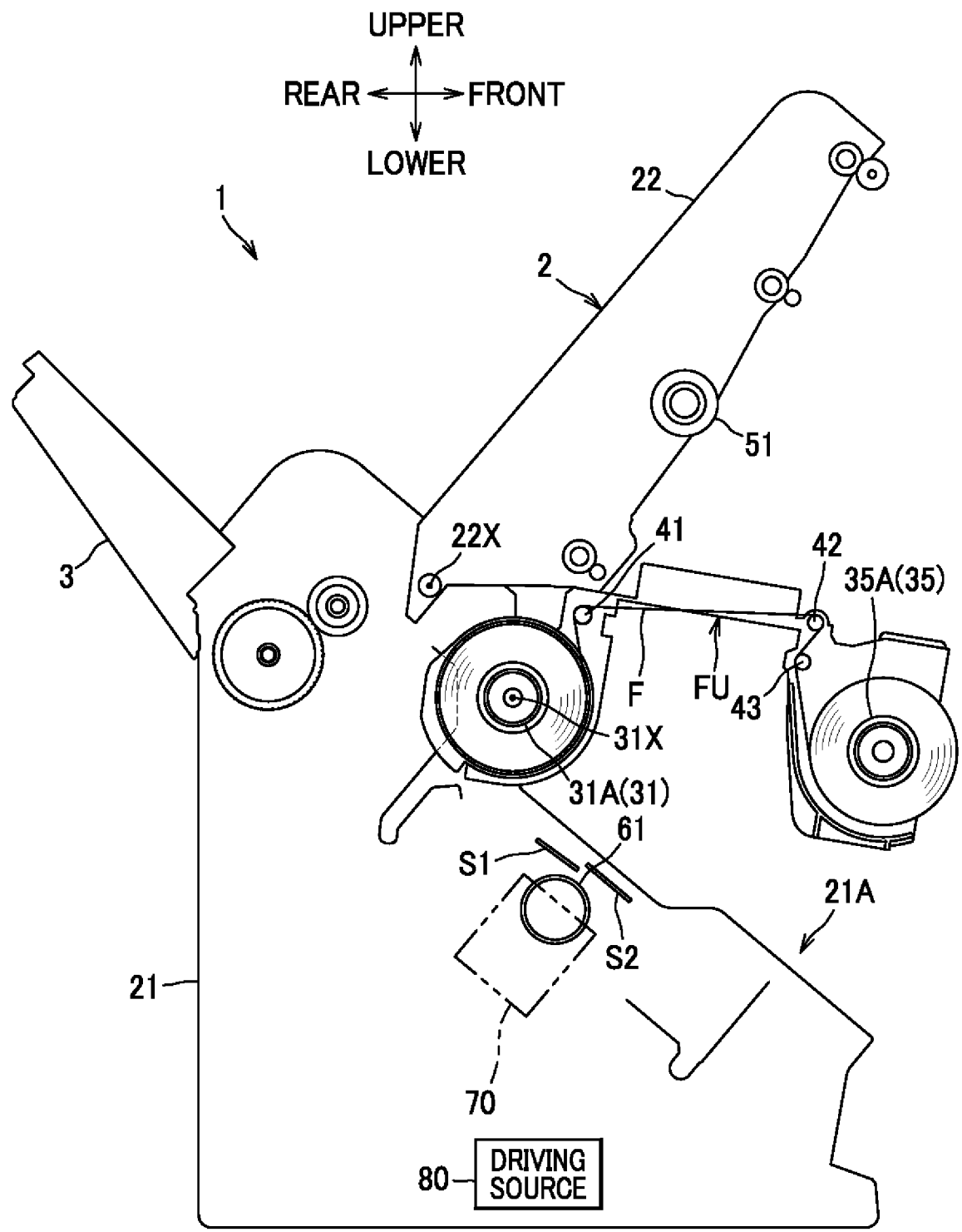
FIG. 2 is a diagram showing an open cover state of the layer transfer device.

The film unit FU is configured, as shown in FIG. 2, to be installable into and removable from the housing main body 21 through the opening 21A along a direction perpendicular to a rotation axis 31X of a supply reel 31 which will be described later. The film unit FU includes a supply reel 31, a take-up reel 35, a first guide shaft 41, a second guide shaft 42, and a third guide shaft 43. A multilayer film F is wound on the supply reel 31 of the film unit FU.

Figure 1B:
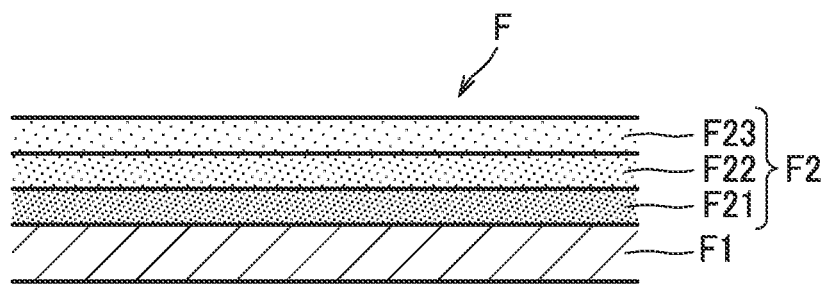
FIG. 1B is a section view showing a structure of a multilayer film.

As shown in FIG. 1B, the multilayer film F is a film made up of a plurality of layers. To be more specific, the multilayer film F includes a supporting layer F1 and a supported layer F2.

The supporting layer F1 is a transparent substrate in the form of a tape and made of polymeric material, and supports the supported layer F2. The supported layer F2 includes several layers, such as a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, such as vinyl chloride resin, acrylic resin, etc., which tends to adhere to a toner image heated by the transfer unit 50 which will be described later.

The supply reel 31 is made of plastic or the like, and includes a supply shaft 31A on which a multilayer film F is wound. One end of the multilayer film F is fixed to the supply shaft 31A.

The take-up reel 35 is made of plastic or the like, and includes a take-up shaft 35A on which to take up the multilayer film F. The other end of the multilayer film F is fixed to the take-up shaft 35A.

It is to be understood that in FIG. 1 or other drawing figures, the supply reel 31 and the take-up reel 35 are illustrated as if the both reels were wound up to the maximum. In actuality, the film unit FU in new condition has its multilayer film F wound on the supply reel 31 in a roll of a maximum diameter, while no multilayer film F is wound on the take-up reel 35, or the multilayer film F is wound on the take-up reel 35 but in a roll of a minimum diameter. When the film unit FU is at the end of its life (i.e., the multilayer film F has been exhausted), the multilayer film F is wound on the take-up reel 35 in a roll of a maximum diameter, while no multilayer film F is wound on the supply reel 31, or the multilayer film F is wound on the supply reel 31 but in a roll of a minimum diameter.

The first guide shaft 41 is a shaft for changing a traveling direction of the multilayer film F drawn out from the supply reel 31. The first guide shaft 41 is made of plastic or the like.

The second guide shaft 42 is a shaft for changing a traveling direction of the multilayer film F guided by the first guide shaft 41. The second guide shaft 42 is made of plastic or the like.

The first guide shaft 41 is located upstream of the transfer unit 50, specifically, the heating roller 61 which will be described later in detail, in a direction of conveyance of a sheet S. The first guide shaft 41 and the second guide shaft 42 guide the multilayer film F in the direction of conveyance of the sheet S. Herein, the direction of conveyance of the sheet S is a direction nonparallel to the rotation axis 31X of the supply reel 31 and to a direction of installation and removal of the film unit; more specifically, the direction of conveyance of the sheet S is a direction in which the sheet S is conveyed along a path running perpendicular to the rotation axis 31X of the supply reel 31 and to the direction of installation and removal of the film unit FU.

The third guide shaft 43 is a shaft for changing a traveling direction of the multilayer film F guided by the second guide shaft 42 toward the take-up reel 35. The third guide shaft 43 is made of plastic or the like.

The first guide shaft 41 guides the multilayer film F drawn out from the supply reel 31 in such a manner that the multilayer film F is laid under a sheet S being conveyed with a toner image facing downward. The first guide shaft 41 changes a direction of conveyance of the multilayer film F drawn out from the supply reel 31, and guides the multilayer film F in a direction substantially parallel to the direction of conveyance of the sheet S.

The second guide shaft 42 contacts the multilayer film F having passed through the transfer unit 50, and changes a direction of conveyance of the multilayer film F having passed through the transfer unit 50 into a direction different from the direction of conveyance of a sheet S, to thereby guide the multilayer film F in a direction away from the sheet S. The multilayer film F having passed through the transfer unit 50 and conveyed with the sheet S laid thereon goes past the second guide shaft 42 and is thus guided in the direction different from the direction of conveyance of the sheet S, and peeled from the sheet S.

The transfer unit 50 is a unit that heats and pressurizes a sheet S and the multilayer film F laid on each other, to transfer the transfer layer F22 onto a toner image formed on the sheet S. The transfer unit 50 includes a pressure roller 51 as an example of a pressure member, a heating roller 61 as an example of a heating member, and a switching mechanism 70. The transfer unit 50 applies heat and pressure to portions of a sheet S and a multilayer film F laid on each other and nipped between the pressure roller 51 and the heating roller 61.

The pressure roller 51 is a roller comprising a cylindrical metal core with its cylindrical surface coated with a rubber layer made of silicone rubber. The pressure roller 51 is located above the multilayer film F, and is contactable with a back side (opposite to a side on which a toner image is formed) of the sheet S.

The pressure roller 51 has two end portions supported rotatably by the cover 22. The pressure roller 51, which in combination with the heating roller 61, nips the sheet S and the multilayer film F, is driven to rotate by the driving source 80 and causes the heating roller 61 to rotate accordingly. In this way, the sheet S and the multilayer film F nipped between the pressure roller 51 and the heating roller 61 are conveyed according as the pressure roller 51 and the heating roller 61 rotate.

The heating roller 61 is a roller comprising a cylindrical metal tube with a heater located inside, to heat the multilayer film F and the sheet S. The heating roller 61 is located under the multilayer film F, and is in contact with the multilayer film F. The heating roller 61 is provided in the housing main body 21 via the switching mechanism 70.

Figure 4A:
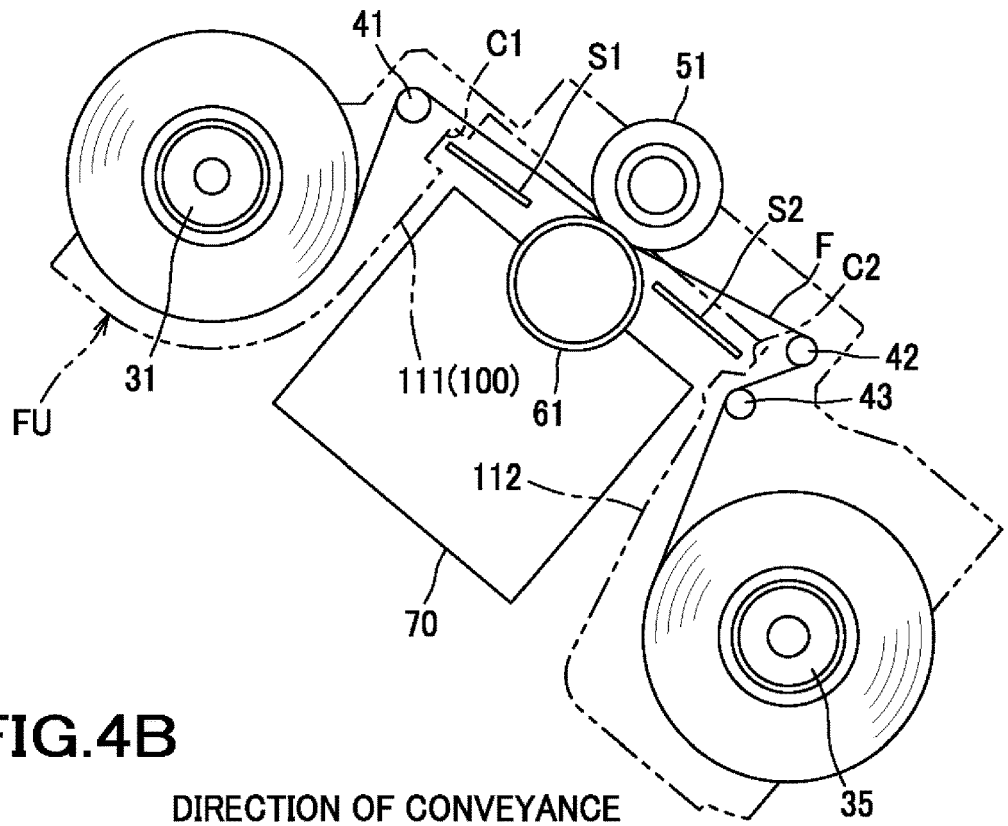
FIG. 4A is a diagram for showing an arrangement of a shutter in its retreated position in the film unit.

The switching mechanism 70 is a mechanism configured to switch a state of the pressure roller 51 and the heating roller 61 to a nip state in which the multilayer film F is nipped between the pressure roller 51 and the heating roller 61 and to a nip release state in which at least one of the rollers 51, 61 is located apart from the multilayer film F. In the present embodiment, the switching mechanism 70 causes the heating roller 61 to move between a nipping position as shown in FIG. 4A and a separate position shown in FIG. 4B, to thereby bring the heating roller 61 into or out of contact with the multilayer film F, selectively. In other words, the switching mechanism 70 causes the heating roller 61 to be separated from the multilayer film F to switch the state of the pressure roller 51 and the heating roller 61 to the nip release state. On the other hand, the switching mechanism 70 causes the heating roller 61 to be brought into contact with and pressed against the multilayer film F to switch the state of the pressure roller 51 and the heating roller 61 to the nip state.

With the layer transfer device 1 configured as described above, sheets S stacked on the sheet tray 3 with front surfaces facing downward are conveyed one by one toward the transfer unit 50 by the sheet feed mechanism 11. Each sheet S is laid on a multilayer film F supplied from the supply reel 31 at a position upstream of the transfer unit 50 in a sheet conveyance direction, and conveyed to the transfer unit 50 with a toner image of the sheet S being kept in contact with the multilayer film F.

In the transfer unit 50, the sheet S and the multilayer film F nipped and passing through between the pressure roller 51 and the heating roller 61 are heated and pressurized by the heating roller 61 and the pressure roller 51, so that the transfer layer F22 is transferred onto a toner image. In the following description, the transfer of the transfer layer F22 onto a toner image will be referred to simply as "layer transfer".

After the layer transfer is complete, the sheet S and the multilayer film F adhered to each other are conveyed to the second guide shaft 42. When the sheet S and the multilayer film F travels past the second guide shaft 42, the direction of conveyance of the multilayer film F is changed into a direction different from the direction of conveyance of the sheet S; thereby the multilayer film F is peeled from the sheet S.

The multilayer film F peeled from the sheet S is taken up on the take-up reel 35. On the other hand, the sheet S from which the multilayer film F is peeled has a foil transferred surface facing downward and is ejected to the outside of the housing 2 by the sheet ejection mechanism 12.

The housing main body 21 further includes a locking mechanism RM, a temperature sensor Sa, and a controller 300. The locking mechanism RM is a mechanism configured to lock the cover 22 in the closed position. The locking mechanism RM is capable of switching a state of the cover 22, by switching a state of energization, to a lock state in which the cover 22 is locked in the closed position and to an unlock state in which the cover 22 is unlocked and released from the closed position.

The locking mechanism RM may, for example, be configured to include a self-holding solenoid and a spring. The self-holding solenoid includes a plunger, a coil, and a permanent magnet. The plunger is capable of reciprocating motion, and is movable to a lock position and to an unlock position. The plunger in the lock position is engaged in a hole formed in the cover 22 so that the cover 22 is locked in the closed position. The plunger in the unlock position is disengaged from the hole formed in the cover 22 so that the cover 22 is releasable from the closed position. The plunger is biased by the spring toward the lock position. The self-holding solenoid is configured such that when the coil is energized, the plunger is caused to move to the unlock position against the biasing force of the spring, whereas the plunger is retained in the lock position by the biasing force of the spring unless the coil is energized. The permanent magnet serves to hold the plunger in the unlock position.

The controller 300 includes a central processing unit (CPU), a random-access memory (RAM), a read-only memory (ROM), and an input/output processor circuit. The controller 300 executes processes of control by performing a variety of computations and operations based on programs and data stored in the ROM, etc. The controller 300 is configured to cause the locking mechanism RM to keep the state of the cover 22 in the lock state, if a temperature detected by the temperature sensor Sa is equal to or higher than a predetermined temperature. The controller 300 is configured to cause the locking mechanism RM to keep the state of the cover 22 in the unlock state, if the temperature detected by the temperature sensor Sa is lower than the predetermined temperature.

The controller 300 exercises control over the switching mechanism 70 such that motion of the heating roller 61 to the nipping position takes place in coordination with timing of supply of a sheet S to the transfer unit 50. The controller 300 exercises control over the switching mechanism 70 such that the heating roller 61 is in the separate position (i.e., the heating roller 61 is separate from the multilayer film F) during a period of time in which layer transfer on a sheet S is not in process. In this way, under control of the controller 300, the switching mechanism 70 is configured to keep the separate state in which the heating roller 61 is in the separate position, infallibly when the cover 22 is in the open position.

Figure 3:
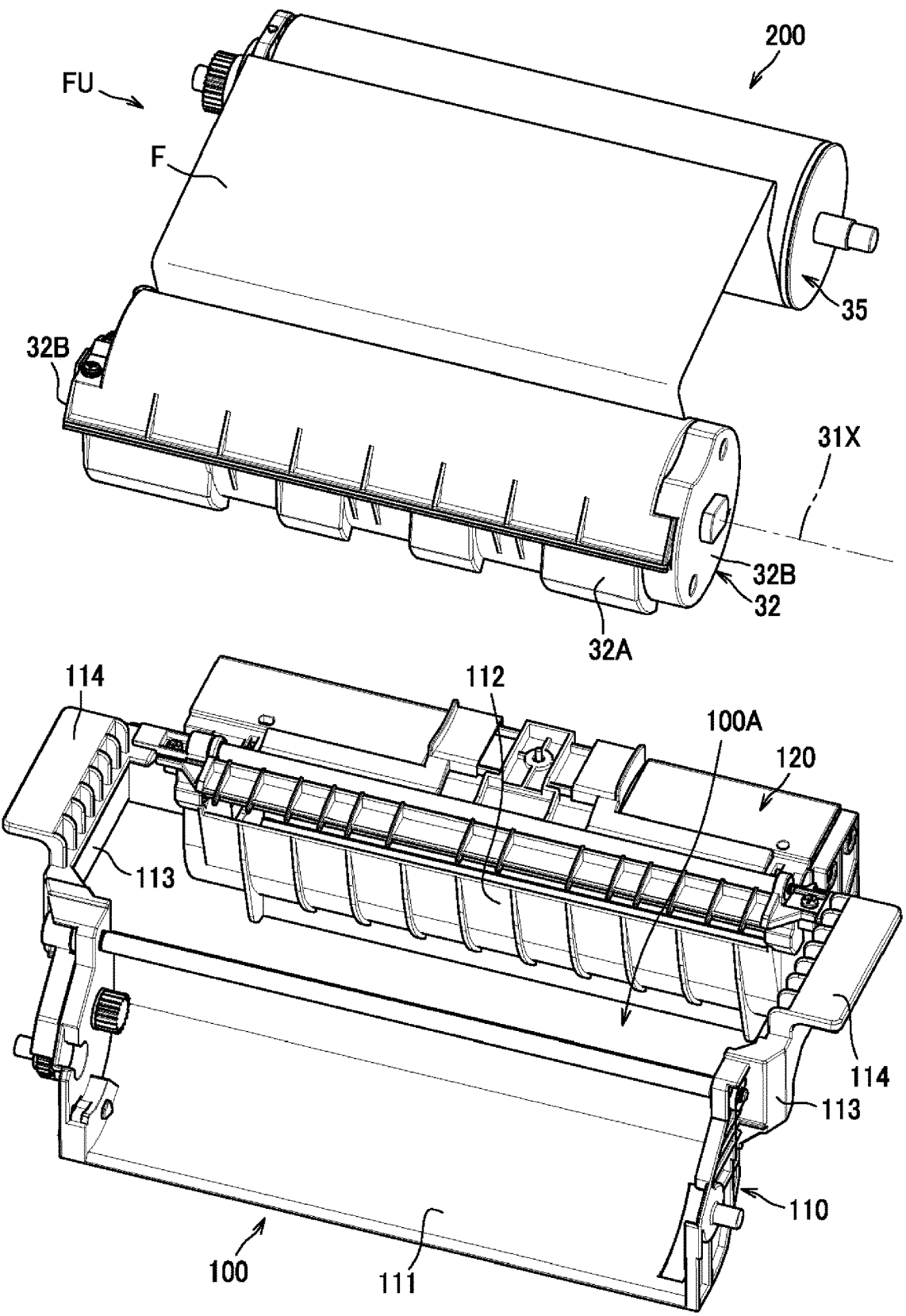
FIG. 3 is an exploded perspective view of a film unit as disassembled into a holder and a film cartridge.

As shown in FIG. 3, the film unit FU includes a holder 100 made of plastic or the like, and a film cartridge 200 installable into and removable from the holder 100. The film cartridge 200 includes, in addition to the supply reel 31 and the take-up reel 35 on which a multilayer film F is wound as described above, and a supply case 32.

The supply reel 31 (more specifically, the supply case 32) and the take-up reel 35 are installable into and removable from the holder 100 in directions perpendicular to the rotation axis 31X (axial direction) of the supply reel 31. The film cartridge 200 installed in the holder 100 is configured to be installable into and removable from the housing main body 21.

The supply case 32 is a hollow case accommodating the supply reel 31. The supply case 32 is made of plastic or the like, and includes an outer peripheral wall 32A having a generally to cylindrical shape, and two side walls 32B each having a generally discoidal shape. The two side walls 32B are provided at both ends of the outer peripheral wall 32A. The supply reel 31 is rotatably supported by the respective side walls 32B of the supply case 32.

The holder 100 includes a base frame 110 and a restraining frame 120 rotatably (movably) supported by the base frame 110. The base frame 110 includes a first holding portion 111, a second holding portion 112, two connecting portions 113 and two handles 114.

The first holding portion 111 is a portion that holds the supply case 32. The first holding portion 111 holds the supply reel 31 via the supply case 32.

The second holding portion 112 is a portion that holds the take-up reel 35. To be more specific, the second holding portion 112 is combined with the restraining frame 120 to make up a hollow case, and the take-up reel 35 is accommodated in the hollow case.

The two connecting portions 113 are portions that connect the first holding portion 111 and the second holding portion 112. To be more specific, the connecting portions 113 are arranged apart from each other in the axial direction (directions parallel to the rotation axis 31X) of the supply reel 31.

With the connecting portions 113 being formed in this way, the holder 100 is provided with a through hole 100A extending in a perpendicular direction perpendicular to the rotation axis 31X of the supply reel 31. One handle 114 is provided on each of the connecting portions 113. The handles 114 are located at opposite ends of the holder 100 apart from each other in the axial direction of the take-up reel 35.

Figure 4B:
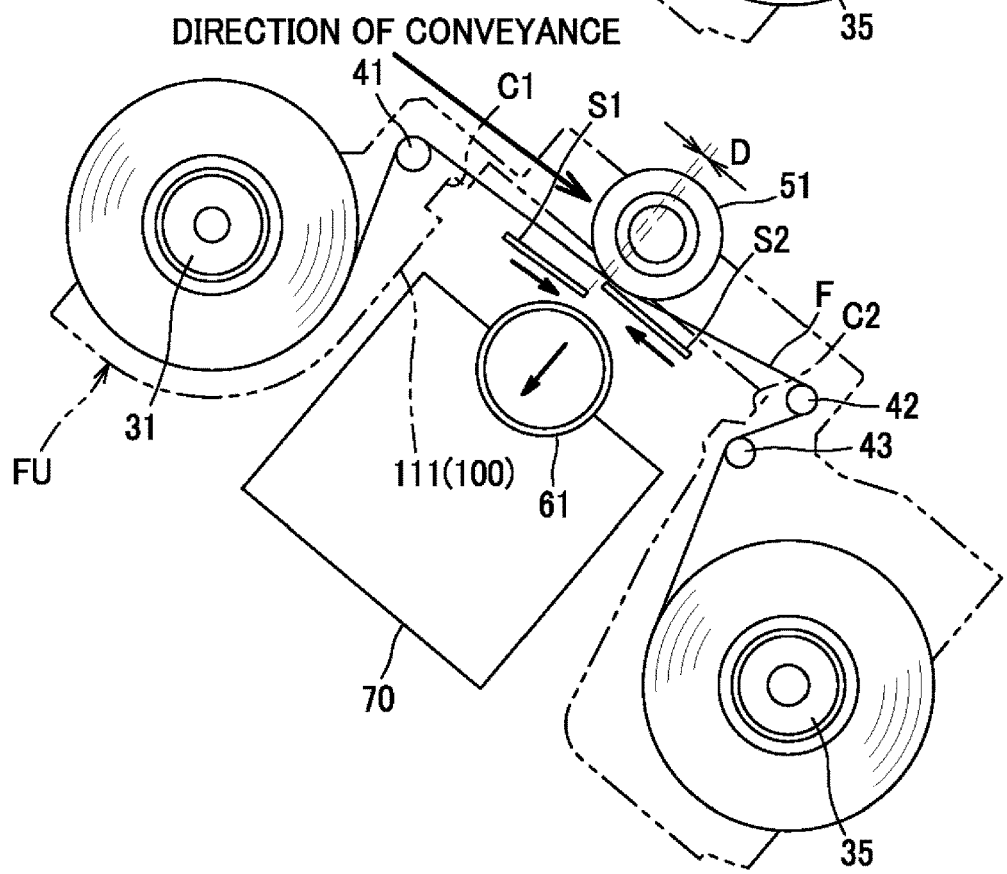
FIG. 4B is a diagram for showing an arrangement of the shutter in its protecting position in the film unit.

As shown in FIGS. 4A and 4B, the layer transfer device 1 further includes a first shutter S1 and a second shutter S2. The first shutter S1 and the second shutter S2 are an example of a shutter. The first shutter S1 and the second shutter S2 are each configured to be movable between a protecting position (position shown in FIG. 4B) in which the pressure-roller 51-side of the heating roller 61 is covered with the shutters S1, S2, and a retreated position (position shown in FIG. 4A) in which the shutters S1, S2 are away from the protecting position. To be more specific, the first shutter S1 and the second shutter S2 are configured to be movable toward and away from each other along the direction of conveyance of the sheet S.

The first shutter S1 and the second shutter S2 are configured to move from the protecting positions to the retreated positions in coordination with the switching mechanism 70 switching the state of the heating roller 61 and the pressure roller 51 from the separate state to the nipping state. Also, the first shutter S1 and the second shutter S2 are configured to move from the retreated positions to the protecting positions in coordination with the switching mechanism 70 switching the state of the heating roller 61 and the pressure roller 51 from the nipping state to the separate state. Structures and mechanism for coordinated operations of the first shutter S1, the second shutter S2, and the switching mechanism 70 will be described later in detail.

As described above, the switching mechanism 70 under control of the controller 300 is configured to keep the separate state without fail when the cover 22 is in the open position. Accordingly, the first shutter S1 and the second shutter S2 are located in the protecting positions when the cover 22 is in the open position.

The first shutter S1 and the second shutter S2 are configured to move along the multilayer film F extending between the first guide shaft 41 and the second guide shaft 42 while being kept apart from the multilayer film F.

The film unit FU has a first recess C1 configured to receive the first shutter S1 in the retreated position, and a second recess C2 configured to receive the second shutter C2 in the retreated position. The first recess C1 is formed in the first holding portion 111 of the holder 100. The second recess C2 is formed in the second holding portion 112 of the holder 100.

As shown in FIG. 4B, the direction of conveyance of the sheet S is slanted with respect to the horizontal plane (see also FIG. 1). The first shutter S1 is located higher than the second shutter S2. More specifically, when the first shutter S1 and the second shutter S2 are in the retreated positions, the first shutter S1 in its entirety is located higher than the second shutter S2. On the other hand, when the first shutter S1 and the second shutter S2 are in the protecting positions, part of the first shutter S1 is located higher than the second shutter S2. When the first shutter S1 and the second shutter S2 are in the protecting positions, the first shutter S1 is located apart, at a distance D, from the second shutter S2 in a direction of movement of the first shutter S1.

The second shutter S2 is located closer, than the first shutter S1, to the opening 21A (see FIG. 2). In other words, the second shutter S2 is located closer, than the first shutter S1, to the pressure roller 51 in a direction along a line connecting the rotation axis of the heating roller 61 and the rotation axis of the pressure roller 51 as located when the cover 22 is in the closed position.

When the first shutter S1 and the second shutter S2 are in the protecting positions, the upper edge of the second shutter S2 is located higher than the lower edge of the first shutter S2; therefore, projection of the second shutter S2 on the first shutter S1 in a horizontal direction overlaps the first shutter S1.

Figure 5:
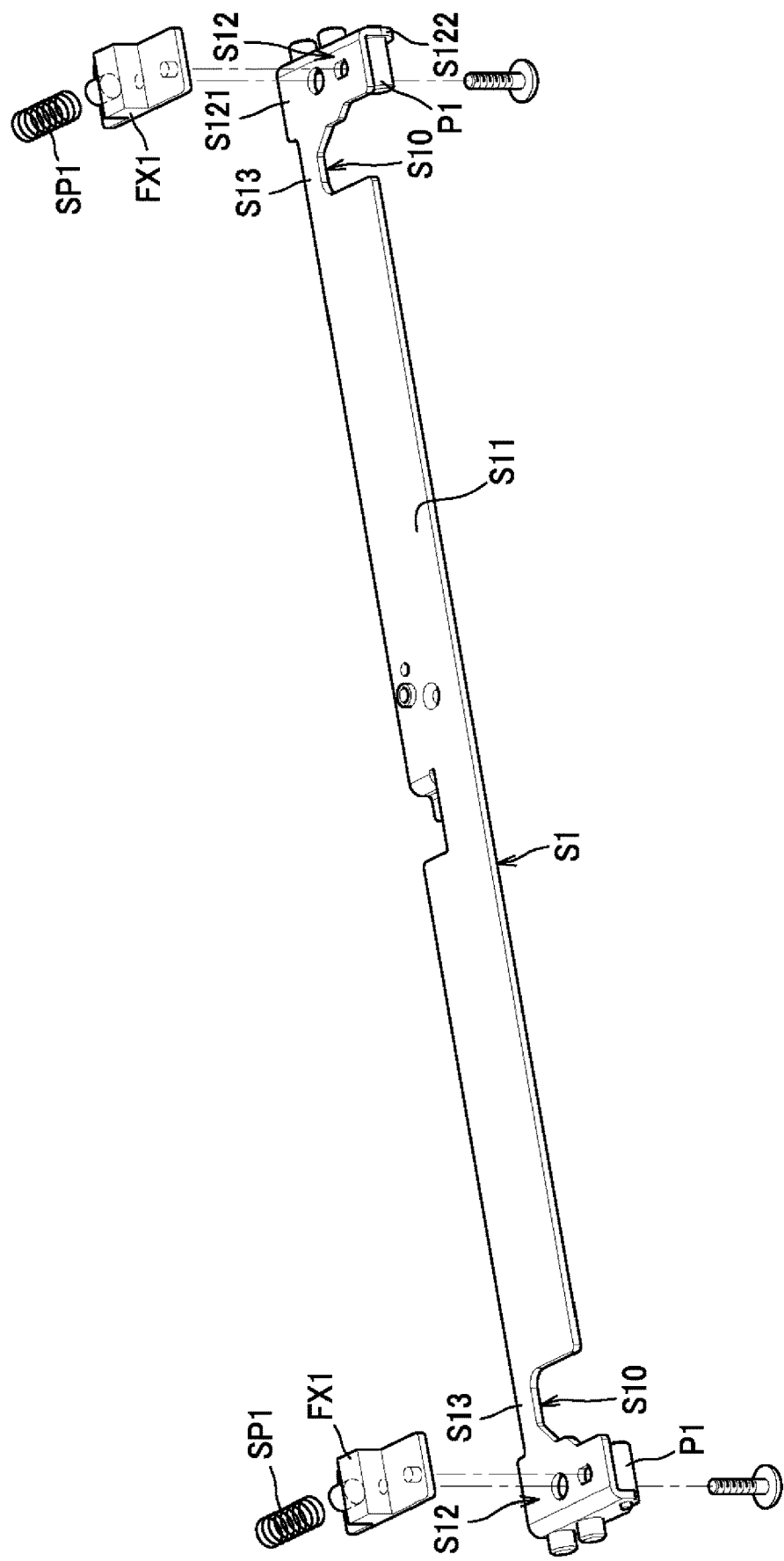
FIG. 5 is a perspective view of a first shutter.

As shown in FIG. 5, the first shutter S1 has a shape of a rectangular plate having a length oriented along the rotation axis 22X. The rectangular plate has two longer sides and two ends. The first shutter S1 has two indentations S10 in one side edge near the ends of the rectangular plate.

The first shutter S1 includes a first portion S11 provided in the middle (midsection) in the axial direction, and second portions S12 provided at two ends apart from each other in the axial direction. The first portion S11 is located between the second portions S12. The first portion S11 is a portion with which the heating roller 61 is to be covered. The first portion S11 is located between the two indentations S10. The second portions S12 are located across the indentations S10 from the first portion S11.

The first shutter S1 further includes third portions S13 having a width (dimension in the direction of movement of the first shutter S1) smaller than that of the first portion S11 and smaller than that of the second portions S12. The third portions S13 are located at two ends (outer ends) of the first portion S11 facing outward in the axial direction. The third portions S13 are located at inner ends of the second portions S12 facing inward in the axial direction. Accordingly, the second portions S12 are connected via the third portions S13 to the first portion S11. The third portions S13 are narrower portions that provide edge-indented portions of the rectangular plate, defining bottoms of the indentations S10. One of the outer ends of the first portion S11, the inner end of a corresponding second portion S12 and an indented side edge of a corresponding third portion S12 form a corresponding indentation S10.

Each second portion S12 includes a base S121, a flange S122, and a pin P1. The base S121 is connected to the corresponding third portion S13. The flange S122 extends downward (toward the heating roller 61 side) from an outer end of the base S121 facing outward in the axial direction (opposite to an inner end of the base S121 which faces inward to the third portion S13 side). The pin P1 is provided on the flange S122 and configured to be contactable with the switching mechanism 70.

The pin P1 protrudes from the flange S122 inward in the axial direction. The pin P1 is located under the base S121. The second portion S12 is configured to receive a force from the switching mechanism 70 via the pin P1. To be more specific, the second portions S12 are configured to receive a force to produce a motion of the first shutter S1 from the protecting position to the retreated position, from the switching mechanism 70.

The first shutter S1 is provided with two fixing members FX1 and two springs SP1.

One fixing member FX1 and one spring SP1 are provided at each end of the first shutter S1 facing outward in the axial direction (specifically, on each second portion S12).

The fixing member FX1 is made, for example, of plastic, and is fixed to the base S121 of the corresponding second portion S12.

The springs SP1 are configured to bias the first shutter S1 from the retreating position toward the protecting position. The springs SP1 are attached to the fixing members FX1, respectively, and bias the second portions S12 of the first shutter S1 via the fixing members FX1.

Figure 6:
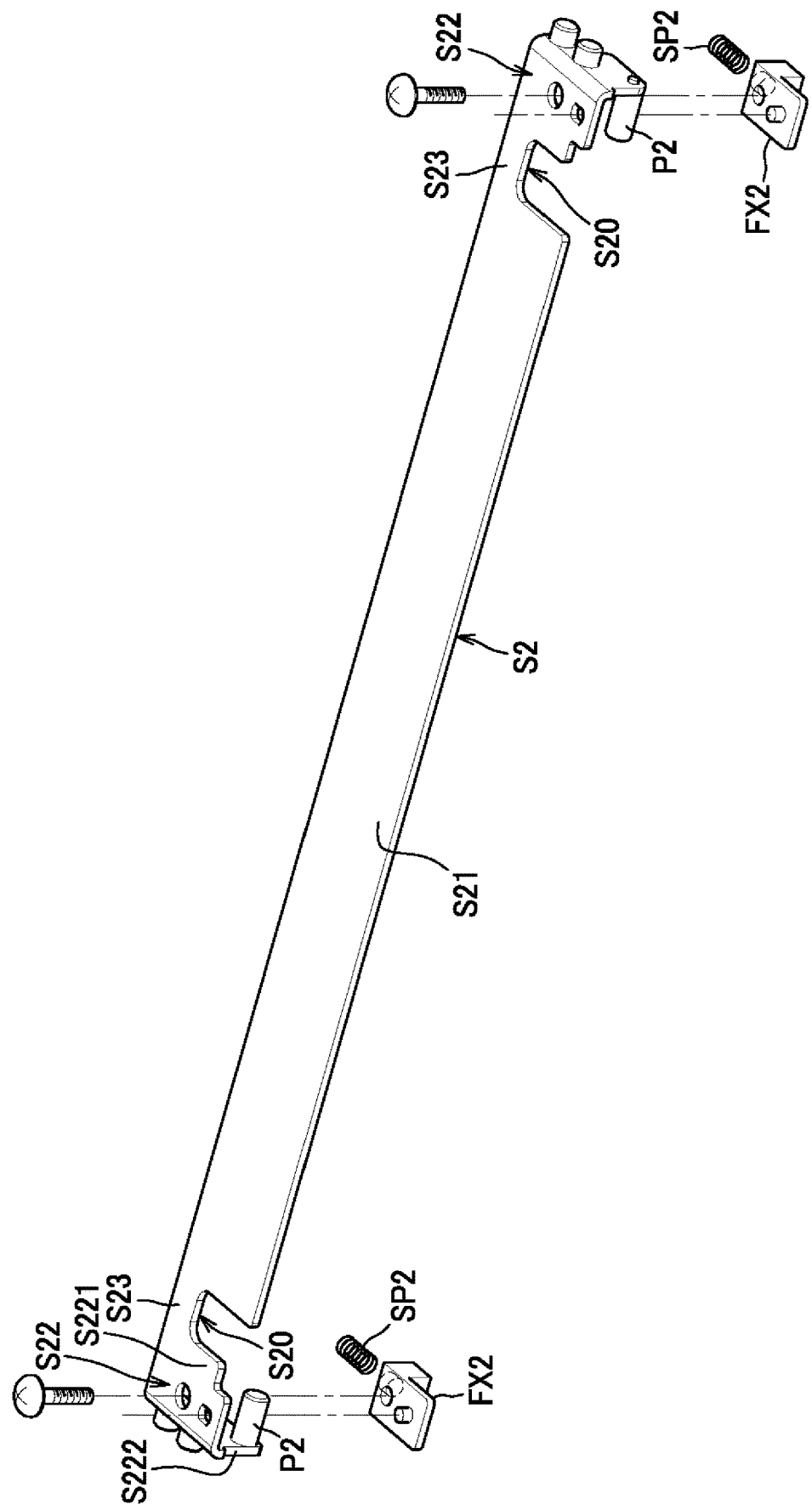
FIG. 6 is a perspective view of a second shutter.

As shown in FIG. 6, the second shutter S has substantially the same structure as that of the first shutter S1 described above. Specifically, the second shutter S2 includes indentations S20, a first portion S21, second portions S22, third portions S23, bases S221, flanges S222, and pins P2, corresponding to the elements S10, S11, S12, S13, S121, S122, and Pb of the first shutter S1.

Similarly, a fixing member FX2 and a spring SP2 are provided at each end of the second shutter S2 facing outward in the axial direction (specifically, on each second portion S22). Two fixing members FX2 and two springs SP2 also have substantially the same structures and arrangement as those of the fixing members FX1 and the springs SP1 provided on the first shutter S1.

Figure 7A:
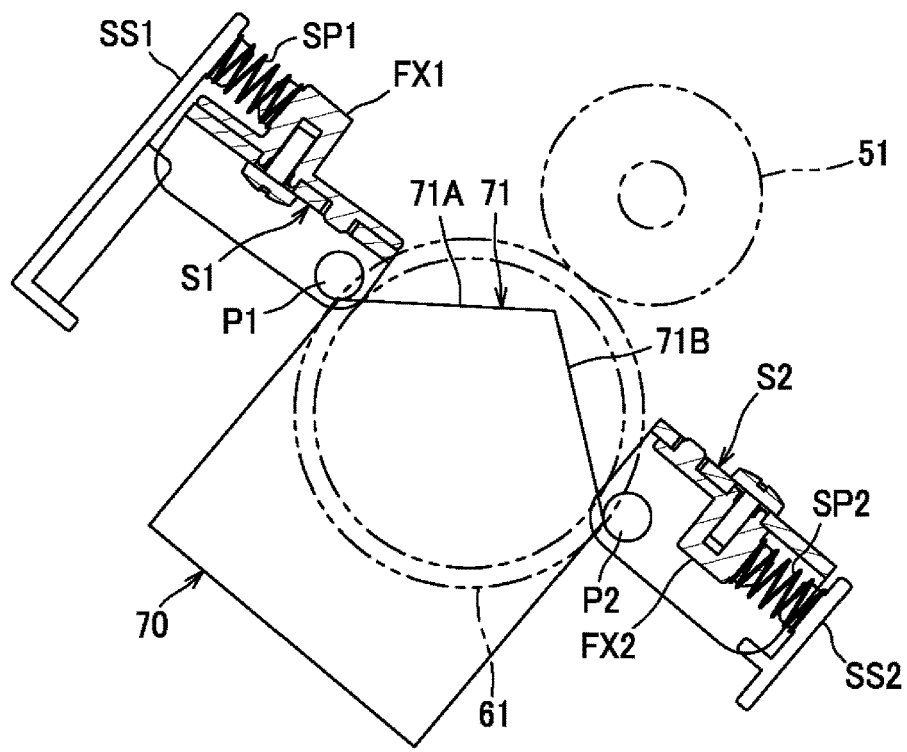
FIG. 7A is a diagram showing the first and second shutters each located in the retreated position with a structure for causing the shutters to move in coordination with the operation of a switching mechanism.

As shown in FIG. 7A, the housing main body 21 includes spring support portions SS1, SS2. Each spring SP1 is located between the spring support portion SS1 and the corresponding fixing member FX1. Each spring SP2 is located between the spring support portion SS2 and the corresponding fixing member FX2.

The switching mechanism 70 includes two thrust portions 71 located at both ends apart from each other in the axial direction. Each thrust portion 71 has a shape of a wedge. The thrust portion 71 has a first pressing surface 71A to be pressed against the pin P1 and a second pressing surface 71B to be pressed against the pin P2.

Figure 7B:
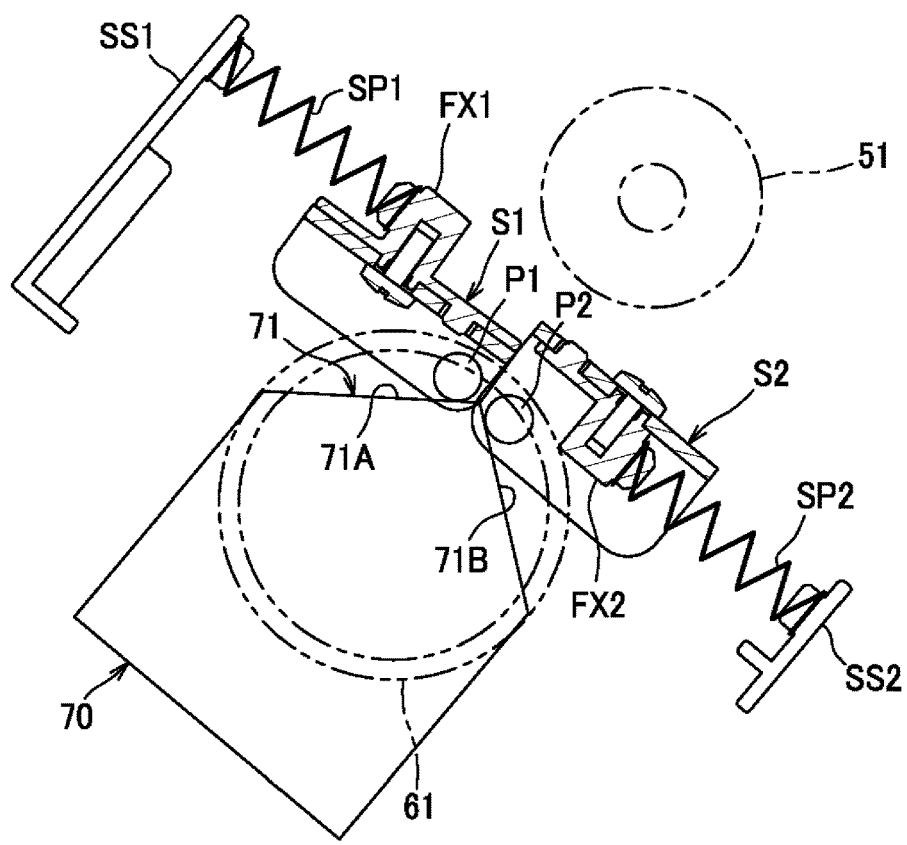
FIG. 7B is a diagram showing the first and second shutters each located in the protecting position with the structure for causing the shutters to move in coordination with the operation of the switching mechanism.

The thrust portion 71 has a ridge at the border between the first pressing surface 71A and the second pressing surface 71B. The ridge of the thrust portion 71 is located, as shown in FIG. 7B, between the pin P1 and pin P2 when the shutters S1, S2 are located in the protecting positions. Once the switching mechanism 70 is caused to switch the state of the heating roller 61 and the pressure roller 51 from the separate state shown in FIG. 7B to the nipping state shown in FIG. 7A, the pressing surfaces 71A, 71B thrust the pins P1, P2 apart from each other, so that the shutters S1, S2 are caused to move against the biasing force of the springs SP1, SP2 to the retreated positions.

It is to be understood that the both ends of the shutters S1, S2 in the axial direction are slidably supported by guides (not shown) provided in the housing main body 21.

As shown in FIG. 8, the housing main body 21 includes two bearings BR on which the ends of the heating roller 61 are rotatably supported. The shutters S1, S2 are located in place and restrained from moving in directions parallel to the rotation axis 31X by contact with the bearings BR.

Figure 9A:
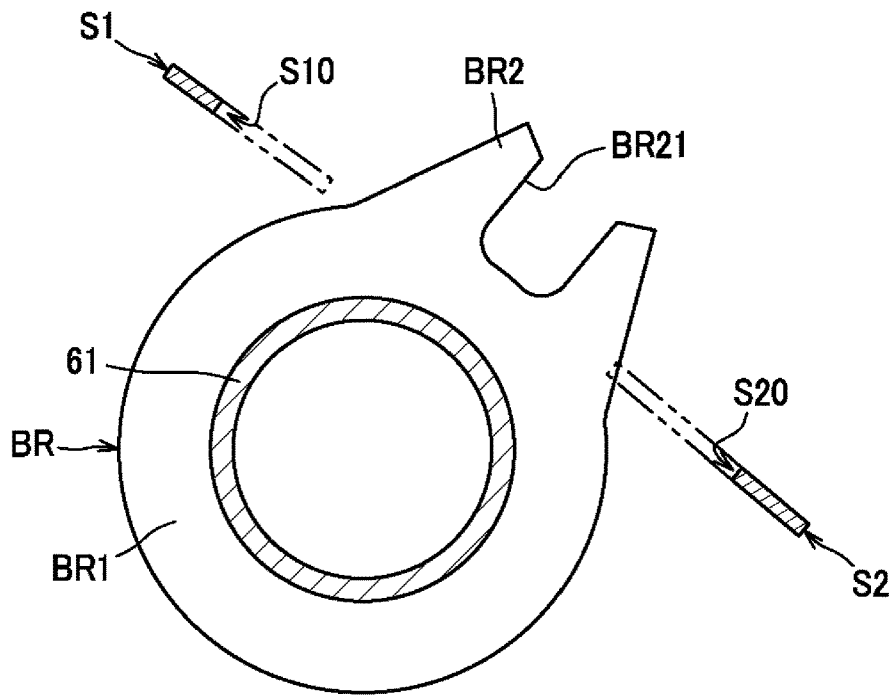
FIG. 9A is a diagram showing the first and second shutters each located in the retreated position, for explaining a relationship between each of the shutters and the bearing.
Figure 9B:
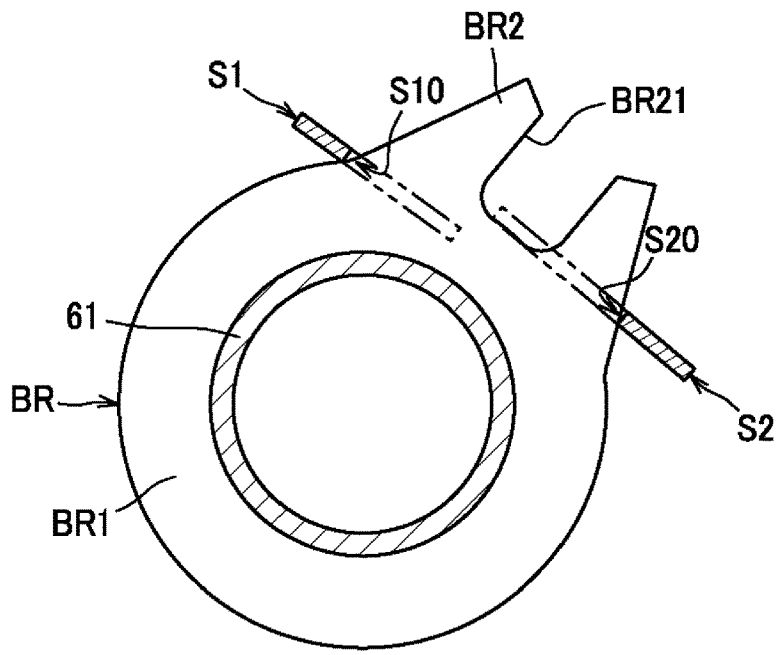
FIG. 9B is a diagram showing the first and second shutters each located in the protecting position, for explaining a relationship between each of the shutters and the bearing.

Specifically, the first portions S11, S21 of the shutters S1, S2 have lengths in the axial direction substantially equal to (in actuality, slightly smaller than) a distance between the two bearings BR in the axial direction. As shown in FIG. 9B, when the shutters S1, S2 are in the protecting positions, the bearings BR are located inside the indentations S10, S20.

Each bearing BR includes a cylindrical base BR1 on which the heating roller 61 is rotatably supported, and a protrusion BR2 which protrudes from the outer peripheral surface of the base BR1. The protrusion BR2 includes a groove BR21 configured to be engageable with the shaft of the pressure roller 51.

When the shutters S1, S2 are in the protecting positions, the first portions S11, S21 are located between the two bearings BR, as illustrated by chain double-dashed lines in FIG. 8. In this state, if the first shutter S1 is moved, for example, in a direction along the axial direction, the first portion S11 is brought into contact with the bearing BR, so that the motion of the first shutter S1 in the axial direction is restricted and the first shutter S1 is located in place. It is to be understood that the second shutter S2 has the same features and effects as described above.

Figure 10A:
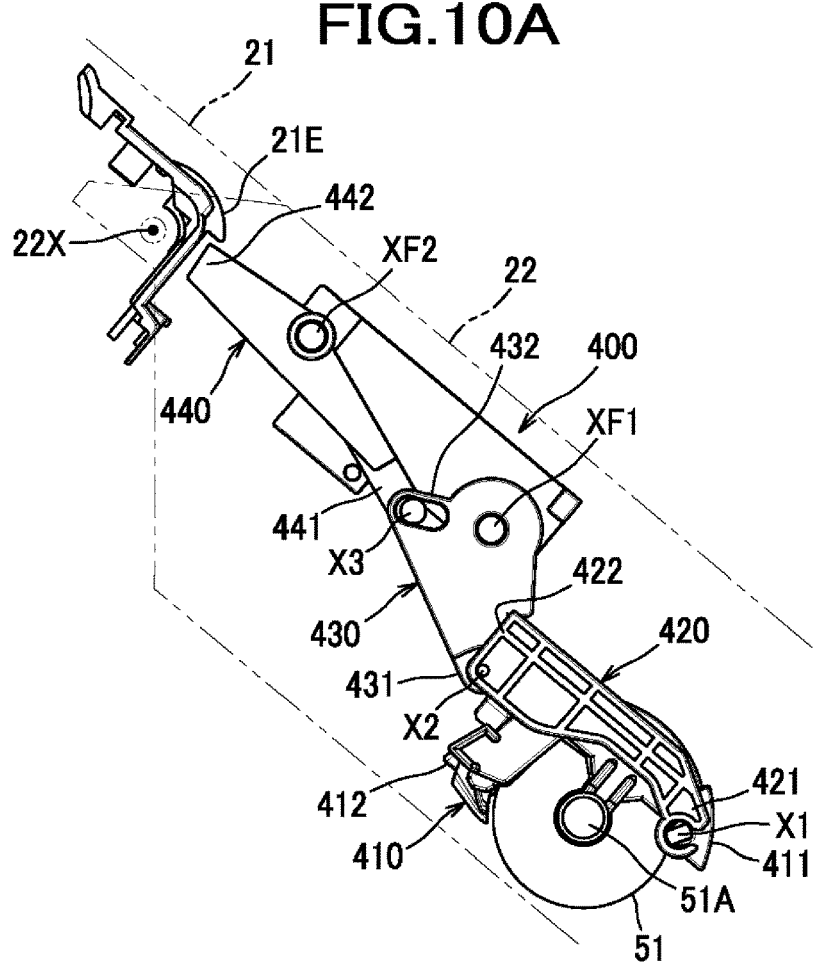
FIG. 10A is a diagram showing a pressure-side shutter in an uncovering position.

As shown in FIG. 10A, the cover 22 is provided with a pressure-side shutter mechanism 410. The pressure-side shutter mechanism 410 includes a pressure-side shutter 410, a first link 420, a second link 430, and a third link 440.

The pressure-side shutter 410 is configured to be movable between a covering position (position shown in FIG. 10B) in which the pressure roller 61 is covered with the pressure-side shutter 410, and an uncovering position (position shown in FIG. 10A) in which the pressure-side shutter 410 is away from the covering position. The pressure-side shutter 410 is configured to be caused to move, in coordination with the motion of the cover 22 between the closed position and the open position, by the links 420, 430, 440.

To elaborate, the pressure-side shutter 410 is configured to move from the uncovering position to the covering position in coordination with motion of the cover 22 from the closed position to the open position. Similarly, the pressure-side shutter 410 is configured to move from the covering position to the uncovering position in coordination with the motion of the cover 22 from the open position to the closed position.

The pressure-side shutter 410 is a member having a generally semicylindrical shape configured and arranged to cover a half of an outer cylindrical surface of the pressure roller 51. The pressure-side shutter 410 has a first end 411 and a second end 412 located apart from each other in a circumferential direction of its semicylindrical surface. The pressure-side shutter 410 is rotatably supported on a shaft 51A of the pressure roller 51. When the cover 22 is in the closed position, as shown in FIG. 10A, the pressure-side shutter 410 is located above the pressure roller 51. When the cover 22 is in the closed position, the pressure-side shutter 410 is oriented with the first end 411 located farther, than the second end 412, from the rotation axis 22X of the cover 22. The pressure-side shutter 410 includes a first pivot X1 provided on the first end 411.

The first link 420 is an elongate member having a first end 421 and a second end 422 located apart from each other in its longitudinal direction. The first end 421 of the first link 420 is connected rotatably on the first pivot X1 to the first end 411 of the pressure-side shutter 410. The first link 320 extends from the first pivot X1 toward the rotation axis 22X.

The second link 430 is an elongate member having a first end 431 and a second end 432 located apart from each other in its longitudinal direction. The second end 422 of the first link 420 is rotatably connected via a second pivot X2 to the first end 431 of the second link 430. The second link 430 extends from the second pivot X2 toward the rotation axis 22X.

The third link 440 is an elongate member having a first end 441 and a second end 442 located apart from each other in its longitudinal direction. The third link 440 includes a third pivot X3 provided on the first end 441. The second end 432 of the second link 430 is connected rotatably on the third pivot X3 to the first end 441 of the third link 440. More specifically, the second end 432 of the second link 430 has a slot (elongate hole) formed therein. The slot formed in the second end 432 of the second link 430 is engaged with the third pivot X3 of the third link 440. The third link 440 extends from the third pivot X3 toward the rotation axis 22X.

When the cover 22 is in the closed position, the second end 442 of the third link 440 is located under an engageable part 21E provided in the housing main body 21. This arrangement makes it possible to cause the second end 442 of the third link 440 to engage with the engageable part 21E from below when the cover 22 is caused to rotate from the closed position toward the open position.

The second link 430 and the third link 440 are rotatably supported, respectively, on fixed pivots XF1, XF2 fixed to the cover 22. On the other hand, the first pivot X1, the second pivot X2, and the third pivot X3 are not fixed to the cover 22, and thus movable relative to the cover 22.

Figure 10B:
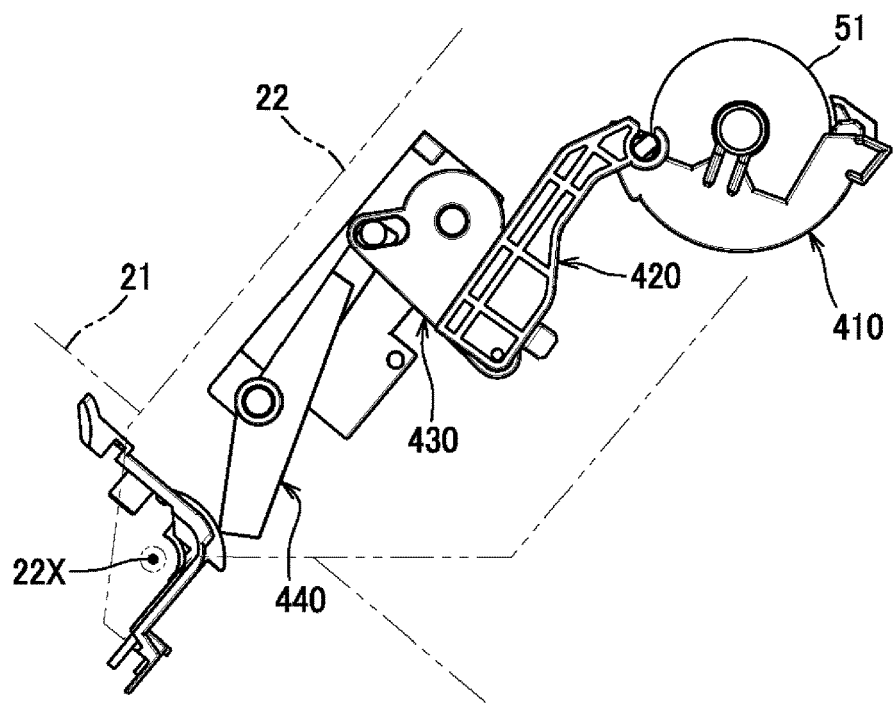
FIG. 10B is a diagram showing the pressure-side shutter in a covering position.

With the pressure-side shutter mechanism 400 configured as described above, when a user causes the cover 22 to rotate from the closed position toward the open position, the second end 442 of the third link 440 engages with the engageable part 21E, and the third link 440 rotates counterclockwise as shown in FIGS. 10A and 10B. Accordingly, the second link 430 connected to the third link 440 is caused to rotate clockwise, and the first link 420 connected to the second link 430 is caused to rotate counterclockwise and move toward the rotation axis 22X, as seen in FIGS. 10A, 10B.

Consequently, the pressure-side shutter 410 connected to the first link 420 is caused to rotate counterclockwise and move from the uncovering position to the covering position as shown in FIGS. 10A and 10B. When the cover 22 is caused to rotate from the open position to the closed position, the pressure-side shutter mechanism 410 operates reversely, so that the pressure-side shutter 410 is caused to move from the covering position to the uncovering position.

According to the present embodiment, the following advantageous effects can be achieved.

Since the shutters S1, S2 are in the protecting positions when the cover 22 is in the open position, a user can be protected from the risk of inadvertent contact with the heating roller 61 during replacement of the film unit FU, or on other occasions.

Since the shutters S1, S2 are caused to move in coordination with the operation of the switching mechanism 70, mechanical power for driving the shutters S1, S2 and the switching mechanism 70 can be derived from a common driving source, that is, driving source 80.

Since the shutters S1, S2 are configured to move along the multilayer film F while being kept apart from the multilayer film F, interference of the shutters S1, S2 with the multilayer film F can be prevented.

Since the shutters S1, S2 moved from the protecting positions to the retreated positions are received in the recesses C1, C2, respectively, the shutters S1, S2 can be moved smoothly without interference with the film unit FU.

Since the shutters S1, S2 are located in place and restrained from moving in directions parallel to the rotation axis 31X of the supply reel 31 by contact with the bearings BR, the structure can be made simpler in comparison with an alternative configuration in which additional locating features other than the bearings BR are provided.

Since the shutters S1, S2 have indentations S10, S20 by which the force applied from the switching mechanism 70 to the second portions S12, S22 can be restrained from being transmitted to the first portions S11, S21, deformation of the first portions S11, S21 can be suppressed.

Since the bearings BR are received inside the indentation when the shutters S1, S2 are in the protecting positions, the second portions S12, S22 configured to receive a force from the switching mechanism 70 can be located on outer sides of the bearings BR. Since the indentations S10, S20 (both ends of the first portions S11, S22 located apart from each other in the axial direction) are located adjacent to the bearings BR, the portion of the heating roller 61 located between the bearings BR can be covered adequately with the first portions S11, S22.

Since the shutter for covering the heating roller 61 is configured to include two shutters (the first shutter S1 and the second shutter S2), the stroke of reciprocating motion of each shutter S1, S2 can be made shorter, in comparison with an alternative configuration in which a single shutter is provided to cover the heating roller 61.

Since the first shutter S1 and the second shutter S2 in the protecting positions are located apart, at the distance D, from each other in the direction of movement of the first shutter S1, the width (dimensions in the directions of movement) of the shutters S1, S2 can be minimized, and the stroke of reciprocating motion of each shutter S1, S2 can be made shorter.

Since the shutters S1, S2 in the protecting positions are located such that projection of the second shutter S2 on the first shutter S1 in a horizontal direction overlaps the first shutter S1, a user who opens the cover 22 and sees the inside of the housing main body 21 from the horizontal direction is prevented from visually recognizing the heating roller 61 through the gap between the shutters S1, S2.

Since the pressure-side shutter 410 that moves to cover the pressure roller 51 in coordination with the motion of the cover 22 to the open position is provided, a user can be protected from the risk of accidental contact with the heated pressure roller 51 during replacement of the film unit FU or on other occasions.

The above-described illustrative, non-limiting embodiment may be modified and implemented in various other forms as will be described below. In the following description, the same structural elements as those described above will be designated by the same reference characters and a duplicated description will be omitted.

Although the cylindrical heating roller 61 is illustrated as an example of the heating member, the heating member may alternatively be configured, for example, as a plate-shaped member to be heated by a heater. Similarly, the pressure member may not be limited to the pressure roller 51, but may alternatively be configured, for example, as an endless belt, or the like.

Although the shutter described above is composed of two shutters S1, S2, the shutter may consist of a single shutter. The shutter may not be configured to make a linear motion, but may be configured as a vault-like member (arched structure) which makes a rotational motion around the outer peripheral surface of the heating roller, for example.

The pressure-side shutter may not be configured to make a rotational motion as described above, but may be configured to make a linear motion.

The transfer layer F22 including a foil is taken as an example above, but a transfer layer may be made, for example, of a thermoplastic resin not including foil or colorant.

The multilayer film F described above has a four-layer structure as an example, but the multilayer film may have any number of layers as long as it includes a transfer layer and a supporting layer.

Although the layer transfer device 1 described above is configured as an independent device separate from an image forming apparatus such as a laser printer, the layer transfer device may alternatively be configured as an integral unit combined with an image forming apparatus. Although the film unit FU described above is configured to include the holder 100 and the film cartridge 200, the film unit may be configured, for example, to consist of the film cartridge 200 only. In this alternative configuration, the structural features of the holder 100 as described above may be combined integrally with the housing main body 21 so that the film unit consisting of the film cartridge 200 may be installable into and removable from the housing main body 21.

Although the shutters S1, S2 are configured to be movable in coordination with the operation of the switching mechanism 70, the shutter may be configured as a member not caused to move in coordination with the switching mechanism but caused to move by a dedicated shutter actuator mechanism. Such a shutter actuator mechanism may, for example, be configured to move a shutter in coordination with the opening/closing operation of the cover.

The elements described in the above embodiment and modified examples may be implemented selectively and in combination.

What is claimed is:

1. A layer transfer device for transferring a transfer layer of a multilayer film onto an image formed on a sheet, the layer transfer device comprising:
   a film unit comprising a supply reel on which the multilayer film is wound, and a take-up reel on which to take up the multilayer film;
   a housing main body having an opening that allows the film unit to be installed into and removed from the housing main body therethrough along a direction perpendicular to a rotation axis of the supply reel;
   a cover movable between an open position in which the opening is open and a closed position in which the opening is closed while the film unit is installed in the housing main body;
   a heating member provided in the housing main body and configured to heat the multilayer film and the sheet;
   a pressure member provided on the cover and configured to nip the multilayer film and the sheet laid on the multilayer film between the heating member and the pressure member; and
   a shutter movable between a protecting position in which the heating member is covered with the shutter, and a retreated position in which the shutter is away from the protecting position,
   wherein the shutter is in the protecting position when the cover is in the open position, and
   wherein the shutter is configured to move along the multilayer film while being kept apart from the multilayer film.

2. The layer transfer device according to claim 1, further comprising a switching mechanism configured to switch a state of the heating member and the pressure member to a nipping state in which the multilayer film is nipped between the heating member and the pressure member and a separate state in which at least one of the heating member and the pressure member is separate from the multilayer film,
   wherein the shutter is:
      movable from the protecting position to the retreated position in coordination with the switching mechanism switching the state of the heating member and the pressure member from the separate state to the nipping state; and
      movable from the retreated position to the protecting position in coordination with the switching mechanism switching the state of the heating member and the pressure member from the nipping state to the separate state.

3. The layer transfer device according to claim 2, further comprising two guide shafts located upstream and downstream, respectively, of the heating member in a direction of conveyance of the sheet that is a direction nonparallel to the rotation axis of the supply reel and to a direction of installation and removal of the film unit, and configured to guide the multilayer film along the direction of conveyance of the sheet.

4. The layer transfer device according to claim 3, wherein the film unit has a recess configured to receive the shutter in the retreated position.

5. The layer transfer device according to claim 3, further comprising a bearing on which the heating member is rotatably supported,
   wherein the shutter is located in place and restrained from moving in directions parallel to the rotation axis by contact with the bearing.

6. The layer transfer device according to claim 5, wherein the shutter comprises a rectangular plate having a length oriented along the rotation axis, the shutter including a first portion provided in a midsection of the rectangular plate with which the heating member is to be covered, two second portions provided at two ends of the rectangular plate and configured to receive a force from the switching mechanism to produce a motion of the shutter in coordination with operation of the switching mechanism, and two edge-indented portions, the first portion being provided between the second portions with each of the edge-indented portions interposed between the first portion and a corresponding second portion, each of the edge-indented portions having an indentation in a side edge of the rectangular plate.

7. The layer transfer device according to claim 6, wherein the bearing is located inside the indentation when the shutter is in the protecting position.

8. The layer transfer device according to claim 3, wherein the shutter comprises a first shutter and a second shutter, which are movable toward and away from each other along the direction of conveyance of the sheet.

9. The layer transfer device according to claim 8, wherein the direction of conveyance of the sheet is slanted with respect to a horizontal plane,
wherein the first shutter is located higher than the second shutter, and the second shutter is located closer, than the first shutter, to the opening, and
wherein when the first shutter and the second shutter are in protecting positions, the first shutter is located apart from the second shutter in a direction of movement of the first shutter, and projection of the second shutter on the first shutter in a horizontal direction overlaps the first shutter.

10. The layer transfer device according to claim 1, further comprising a pressure-side shutter movable between a covering position in which the pressure member is covered with the pressure-side shutter, and an uncovering position in which the pressure-side shutter is away from the covering position,
wherein the pressure-side shutter is in the covering position when the cover is in the open position.

11. The layer transfer device according to claim 10, wherein the pressure-side shutter is movable from the uncovering position to the covering position in coordination with motion of the cover from the closed position to the open position, and to move from the covering position to the uncovering position in coordination with the motion of the cover from the open position to the closed position.

12. The layer transfer device according to claim 1, wherein the heating member is a roller.

13. The layer transfer device according to claim 1, wherein the pressure member is a roller.

14. A layer transfer device for transferring a transfer layer of a multilayer film onto an image formed on a sheet, the layer transfer device comprising:
a film unit comprising a supply reel on which the multilayer film is wound, and a take-up reel on which to take up the multilayer film;
a housing main body having an opening that allows the film unit to be installed into and removed from the housing main body therethrough along a direction perpendicular to a rotation axis of the supply reel;
a cover movable between an open position in which the opening is open and a closed position in which the opening is closed while the film unit is installed in the housing main body;
a heating member provided in the housing main body and configured to heat the multilayer film and the sheet;
a pressure member provided on the cover and configured to nip the multilayer film and the sheet laid on the multilayer film between the heating member and the pressure member; and
a shutter movable between a protecting position in which the heating member is covered with the shutter, and a retreated position in which the shutter is away from the protecting position,
wherein the shutter is in the protecting position when the cover is in the open position, and
wherein the shutter comprises a first shutter and a second shutter, which are movable toward and away from each other along a direction of conveyance of the sheet.

15. The layer transfer device according to claim 14, further comprising a switching mechanism configured to switch a state of the heating member and the pressure member to a nipping state in which the multilayer film is nipped between the heating member and the pressure member and a separate state in which at least one of the heating member and the pressure member is separate from the multilayer film,
wherein the shutter is:
movable from the protecting position to the retreated position in coordination with the switching mechanism switching the state of the heating member and the pressure member from the separate state to the nipping state; and
movable from the retreated position to the protecting position in coordination with the switching mechanism switching the state of the heating member and the pressure member from the nipping state to the separate state.

16. The layer transfer device according to claim 14, further comprising two guide shafts located upstream and downstream, respectively, of the heating member in a direction of conveyance of the sheet that is a direction nonparallel to the rotation axis of the supply reel and to a direction of installation and removal of the film unit, and configured to guide the multilayer film along the direction of conveyance of the sheet, and
wherein the shutter is configured to move along the multilayer film extending between the two guide shafts while being kept apart from the multilayer film.

17. The layer transfer device according to claim 14, wherein the direction of conveyance of the sheet is slanted with respect to a horizontal plane,
wherein the first shutter is located higher than the second shutter, and the second shutter is located closer, than the first shutter, to the opening, and
wherein when the first shutter and the second shutter are in protecting positions, the first shutter is located apart from the second shutter in a direction of movement of the first shutter, and projection of the second shutter on the first shutter in a horizontal direction overlaps the first shutter.

18. A layer transfer device for transferring a transfer layer of a multilayer film onto an image formed on a sheet, the layer transfer device comprising:
a film unit comprising a supply reel on which the multilayer film is wound, and a take-up reel on which to take up the multilayer film;
a housing main body having an opening that allows the film unit to be installed into and removed from the housing main body therethrough along a direction perpendicular to a rotation axis of the supply reel;
a heater provided in the housing main body and configured to heat the multilayer film and the sheet; and
a shutter movable between a protecting position in which the heater is covered with the shutter, and a retreated position in which the shutter is away from the protecting position,
wherein the shutter is configured to move along the multilayer film while being kept apart from the multilayer film.

* * * * *